Sept. 13, 1955  T. BUCHHOLD ET AL  2,717,969
DIRECT CURRENT MOTOR
Filed Feb. 26, 1952  2 Sheets-Sheet 1

INVENTORS
Theodor Buchhold
Walter Haeussermann
Kurt Lindner
BY *J.J. Kesserich, A.W. Dow and P.M. Craig, Jr.*
ATTORNEYS Sept. 13, 1955    T. BUCHHOLD ET AL    2,717,969
DIRECT CURRENT MOTOR Filed Feb. 26, 1952      2 Sheets-Sheet 2

INVENTORS
Theodor Buchhold
Walter Haeussermann
Kurt Lindner
BY G. J. Kessenich, A. W. Dew
and P. M. Craig, Jr.
ATTORNEYS United States Patent Office 2,717,969
Patented Sept. 13, 1955

2,717,969

DIRECT CURRENT MOTOR

Theodor Buchhold, Walter Haeussermann, and Kurt A. Lindner, Huntsville, Ala., assignors to the United States of America as represented by the Secretary of the Army Application February 26, 1952, Serial No. 273,534

2 Claims. (Cl. 310—112)

(Granted under Title 35, U. S. Code (1952), sec. 266)

The invention described in the specification and claims may be manufactured and used by or for the Government for governmental purposes without the payment to us of any royalty thereon.

This invention relates to direct current motors, and more particularly to direct current motors having a low time constant or a short response time.

This invention relates further to direct current motors commonly referred to as direct current servomotors which are used in connection with fast working steering controls.

The principal object of this invention is to provide a new, improved direct current motor which has a very low ratio of time constant to output power.

It is a further object of this invention to provide a compact, efficient direct current motor with a small moment of inertia and a small motor resistance, and which operates with large magnetic flux and prevents excessive heat in the armature.

The above-mentioned objects can only be partially accomplished in a conventional direct current motor, and the compromise which results usually is a motor having an armature of small diameter and relatively great length. Since it is also necessary to keep the inductivity of the armature small in order to obtain the required low time constant split poles are sometimes used. However all these motors have shunt coils at their poles which are strongly excited to produce a large magnetic flux.

In operation servomotors are subjected to frequent starting and reversing. This in turn results in large currents in the armature, and, therefore, in high copper losses. The temperature in the armature, which is a function of these currents, becomes very high and sometimes excessive, especially if the armature has a small diameter and a relatively long axial dimension. This undesirable condition is further accentuated by the fact that the operating temperature of strongly excited field coils, which have large losses, is itself relatively high, which allows at best only a limited amount of heat flow from the armature to the field poles. This raises a serious problem of heat transfer from the armature, which takes place in such motors predominantly in the direction of the bearings. However, this heat transfer is very unsatisfactory since the armature is not a solid body but consists of insulated punchings and is relatively long.

In accordance with the present invention the heat problem in such direct current motors is solved in a new and novel manner by using a combination of split poles excited by permanent magnets. Further advantages are also gained by using two motors, instead of one large one, depending in each case on size and load requirements.

Further objects of this invention will become obvious when taken in connection with the accompanying drawings, which show for purposes of illustration only several specific embodiments of the invention, and wherein.

Figure 1:
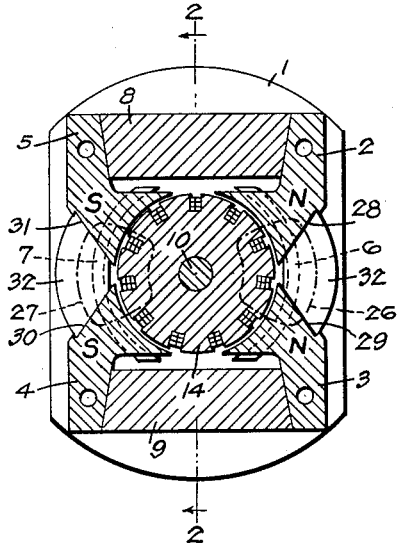
Fig. 1 is a cross sectional view of one embodiment of a direct current motor taken along line 1—1 of Fig. 2.
Figure 2:
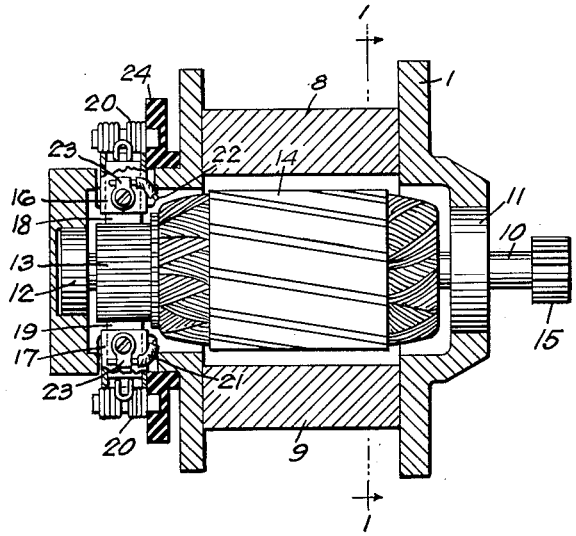
Fig. 2 is a cross sectional view of the motor of Fig. 1 taken along line 2—2 of Fig. 1.
Figure 3:
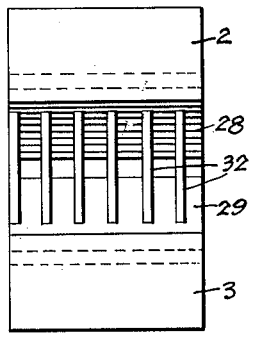
Fig. 3 is side elevation of the pole shoes and cooling plates of Fig. 1.

Referring now more particularly to the drawing, wherein similar reference numerals are used in the various figures to designate similar parts, reference numeral 1 indicates a motor flange. Pole shoes 2—5 are affixed to the flange 1 as by means of screws (not shown) and concentric crescent pieces 6 and 7. Two permanent magnets 8 and 9 of any well-known magnetic material are affixed to said pole shoes 2—5. Shaft 10 is journaled in bearings 11 and 12 and carries commutator 13 and armature 14 intermediate said two bearings 11 and 12. A pinion 15 for driving the load is fixedly mounted on the end of said shaft 10 projecting beyond said flange 1. Two brushholders 16 and 17 support the brushes 18 and 19 which make contact with the commutator bars of commutator 13, proper contact being provided by means of springs 20 which urge said brushes 18 and 19 in the direction of said commutator 13. Wires 21 and 22 which are connected to the direct current line voltage are fastened to said brushholders 16 and 17 by means of connecting lugs 23. Brushholders 16 and 17 are fastened to insulating ring 24 by means of screws (not shown). Insulating ring 24 is adjustably mounted on the support flange 25 which also houses bearing 12.

The aforementioned elements, which are well-known in the prior art, form no part of the present invention and may be made in accordance with well-known practices and techniques in the design of direct current motors.

Pole shoes 2, 3, 4 and 5 are connected to said permanent magnets 8 and 9, pole shoes 2 and 3 forming one split pole and poles shoes 4 and 5 the other. The permanent magnets may be made of any well-known magnetic material. Since these materials are normally very hard and brittle, the permanent magnets 8 and 9 are affixed to the pole shoes 2—5 only by their own magnetic forces and properly positioned by tapered surfaces. This arrangement of the stator has the advantage of permanent field motors wherein no heat is produced in the stator, which permits heat flow from said armature 14 to said pole shoes 2—5. The only unfavorable factor is the great resistance to heat transfer through the air gap, which constitutes a relatively good insulator to heat flow. To reduce this heat resistance it is desirable to decrease the air gap as much as possible and to increase the extent of circumferential coverage by said pole shoes surrounding said armature 14 without producing excessive sparking at the commutator. This not only lowers the heat resistance of the air gap, but also reduces the reluctance of the magnetic circuit thereby permitting greater flux density which is desirable from a point of view of fast response of the motor. Unfortunately, however, with normal pole shoes the decrease in air gap and the increase in the circumferential pole shoe coverage is limited by the additional cross-flux indicated in Fig. 1 by dotted lines 26 and 27.

caused by strong armature currents which will produce fields extending their magnetic lines over the air gap and said pole shoes 2—5. This cross-flux is undesirable because it tends to increase the inductivity of the armature and thereby decreases the resulting main flux. This latter effect results from the cross-flux increasing the saturation of a number of the armature teeth. Both effects, however, cause slower response of the motor.

The motor in accordance with the present invention minimizes these detrimental effects in the following manner. If split poles 2—5 are used as shown in Fig. 1, the cross-flux indicated by dotted lines 26 and 27 which develops in the magnetic circuit, is limited by the large air gaps formed by the oblique edges 28—31 of the split poles 2—5. Another advantage of the particular construction of said split poles 2—5 is the relatively large surface of said oblique edges 28—31 exposed to the air, and yet the almost complete enclosure of said armature 14 by said pole shoes, which facilitates the transfer of heat to the surrounding air through said split poles 2—5. This heat transfer to the surrounding air may be further enhanced by the use of cooling plates or fins 32 arranged in the space between said split poles 2—5.

It has been discovered that for heavier load requirements, it is preferable to use two smaller motors of the type shown and described with respect to Fig. 1 rather than a single larger one. The reason therefore lies in the fact that the response time of two smaller motors is shorter and their temperature rise lower than could be achieved in the design of a single larger motor.

Figure 4:
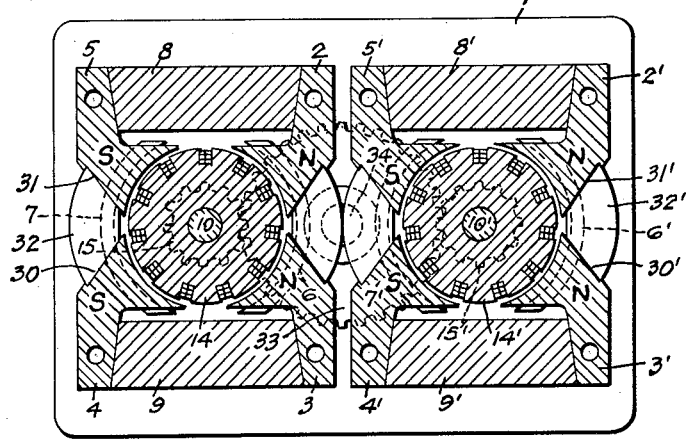
Fig. 4 is cross sectional view similar to Fig. 1 of another embodiment of a direct current motor in accordance with the present invention.

One embodiment of this invention using two small motors is illustrated in Fig. 4, wherein reference numeral 1 designates the flange of the motor. The pole shoes 2—5 and 2'—5' of the two motors are constructed like corresponding pole shoes of the single motor shown in Fig. 1 and affixed to the flange 1 as by means of screws (not shown). Permanent magnets 8, 8', 9 and 9' are affixed to said pole shoes by their own magnetic forces properly positioned by tapered surfaces. Each of the motor shafts 10 and 10' carrying armatures 14 and 14' and pinions 15 and 15' may be journaled in bearings (not shown) in accordance with the disclosure of the motor of Fig. 1. Pinions 15 and 15' engage gear wheel 33 mounted on shaft 34 which may be journaled in any conventional manner by means of bearings (not shown). The output from this motor may be taken off shaft 34 to which the load may be connected in any conventional manner. The additional wheel gear 33 and the two pinions 15 and 15' represent an additional moment of inertia which should be kept as small as possible in order to maintain fast time response of the motor. Accordingly the centers of the two motors should be mounted as close as possible. In order to further facilitate heat transfer from armatures 14 and 14' to the surrounding medium cooling plates or fins 32 may be used as described with respect to Fig. 1.

It should also be pointed out that the above-mentioned construction using two motors offers certain advantages with respect to safety of operation, since continuous control effect may be sustained even though one of the two motors has become inoperative by reason of motor failure or other defects.

Figure 5:
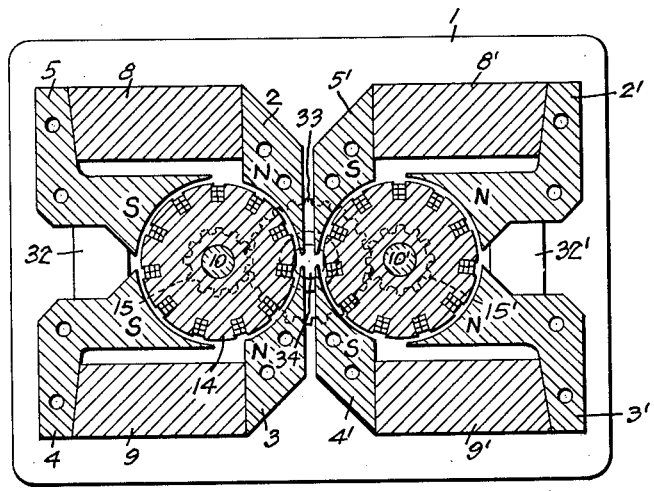
Fig. 5 is a cross sectional view similar to Fig. 1 of a further embodiment of a direct current motor in accordance with the present invention.

A further improvement of the tandem or double motor construction of Fig. 4 is illustrated in Fig. 5. Similar reference numerals have been used to designate similar parts of corresponding elements in Fig. 4. As pointed out above, the additional wheel gear 33 and the two pinions 15 and 15' represent an additional moment of inertia which should be kept as small as possible in order to maintain the fast time response characteristic of the motor. This may be accomplished by the particular pole shoe construction of Fig. 5 which permits closer spacing of the two motor shafts 10 and 10', thereby reducing the total distance between the center lines of the two motors. This in turn reduces the required size of the gear wheel 33, which results in a decrease of moment of inertia of said gear wheel 33.

The particular motor of Fig. 5 is in every respect similar to the motor of Fig. 4 with the exception only of the structure of split pole 2—3 and split pole 4'—5'.

As shown in Figs. 1 and 4 the pole shoes 2', 3' and 4, 5 in Fig. 5 are L-shaped, too, with one leg thereof connected to the permanent magnet and the end of the other leg being so arranged as to form an arc around said armature 14. The difference in the shape of pole shoes 2 and 3 and 4' and 5' is dictated by the permanent magnets 8 and 9, the length of which is required by the magnitude of magnetization. In order to permit closer spacing of the two motor shafts 10 and 10' split poles 2, 3, 4' and 5' of the embodiment of Fig. 5 are made approximately in the form of a parallelogram, with one side thereof connected to said permanent magnets 8, 9, 8' and 9', and another side being shaped to form an arc around said armatures 14 and 14'. The distance between motor shafts 10 and 10' is thereby decreased to an amount approximately equal to the diameter of a rotor in Fig. 4. It is also noted that the permanent magnets 8, 9, 8' and 9' are not symmetrically spaced with respect to the center line of each motor but are displaced therefrom as shown in Fig. 5. Accordingly the horizontal legs of the L-shaped pole shoes 2', 3', 4 and 5 are increased by a corresponding amount.

It is obvious that the over-all dimensions of the tandem or double motor of Fig. 5 are the same as those of Fig. 4 while enabling however a construction which offers a smaller total moment of inertia.

Figure 6:
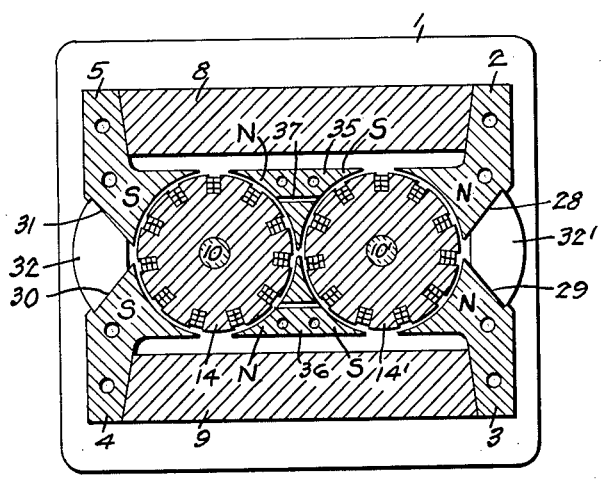
Fig. 6 is a cross sectional view similar to Fig. 1 of a still further embodiment of a direct current motor in accordance with the present invention.

In order to further reduce the spacing between the rotors of the tandem or double motor, only two permanent magnets are used in the embodiment shown in Fig. 6. This permits a further reduction in the distance between the center lines of shafts 10 and 10' and also reduces the cost of construction of the motor. For proper operation the magnetic armature flux must be the same in both armatures 14 and 14'. Then the flux produced by adjacent armature windings of the two motors will compensate each other, and thereby effectively constitute compensating windings with respect to each other.

Pole shoes 2—5 may be constructed in accordance with the disclosure of Fig. 4, and other like parts have been designated by like reference numerals. The outputs of the two motors may be used to drive a single gear wheel (not shown) by means of pinions (also not shown) in accordance with the disclosure of Fig. 4. Reference numerals 35 and 36 designate the center poles, while the air gap 37 therebetween further minimizes the cross-flux. This results in a response time characteristic which is even smaller than that of a single motor with an armature of the same size as in the twin arrangement and constructed in accordance with the disclosure of Fig. 1.

Other modifications of the motor construction may readily occur to anyone skilled in the art, and while we have shown and described several embodiments of our invention, it will be understood that these embodiments are merely for the purpose of illustration and description, and that various other forms and modifications may be devised within the scope of our invention, as defined in the appended claims.

We claim:

1. In a direct current motor a support, two shafts journaled in said support, an armature affixed to each of said shafts, two stators fixed to said support in operative relation with a respective armature, said stators each comprising a pair of permanent magnets and two pole shoes attached to each of said pair of permanent magnets, opposite pole shoes from each of said pair of permanent magnets forming split poles, said pole shoes surrounding a respective one of said armatures and forming therewith an air gap, the said permanent magnets affixed to said pole shoes only by their magnetic force, two pairs of pole shoes being substantially L-shaped and the other two pairs of pole shoes being substantially in the form of a parallelogram with one side thereof forming an arc, whereby the spacing between said shafts is reduced.

2. In a direct current motor having a low time response, a support, two shafts journaled in parallelism in said support, a gear journaled in said support midway between said shafts, two pinions each fixed on a respective shaft and in mesh with said gear, two armatures each fixed to a respective shaft, two stators fixed to said support each in operative relation with a respective armature, said stators each comprising a pair of permanent magnets each said magnet being positioned unsymmetrically with respect to the center line of its respective shaft and two pairs of pole shoes, the shoes of each pair being attached to the ends of a respective one of said pair of permanent magnets, opposite pole shoes from each of said pair of permanent magnets forming split poles, the pole shoes from said pair of permanent magnets having their free ends shaped to surround a respective one of said armatures and forming an air gap therewith, one pole shoe of each said pair being L-shaped and the other pole shoe of each said pair being generally in the form of a parallelogram with one side thereof arced to extend about its armature, whereby the spacing between said shafts and the size of said pinions and gear are maintained at a minimum.

References Cited in the file of this patent

UNITED STATES PATENTS

| | | |
|---|---|---|
| 538,345 | Porter | Apr. 30, 1895 |
| 2,035,756 | Nehlsen | Mar. 31, 1936 |
| 2,298,652 | Schwarzman | Oct. 13, 1942 |
| 2,479,455 | Aronoff | Aug. 16, 1949 |
| 2,652,504 | Pinter | Sept. 15, 1953 |

FOREIGN PATENTS

| | | |
|---|---|---|
| 137,966 | Germany | Jan. 13, 1903 |
| 439,946 | France | Apr. 20, 1912 |